Aug. 16, 1960  C. E. CARD  2,949,138
TIMBER HANDLING APPARATUS FOR RESAWING MILLS
Filed Sept. 25, 1958  6 Sheets-Sheet 2

INVENTOR
CALEB EDGERTON CARD
by R. J. Filipkowski
AGENT

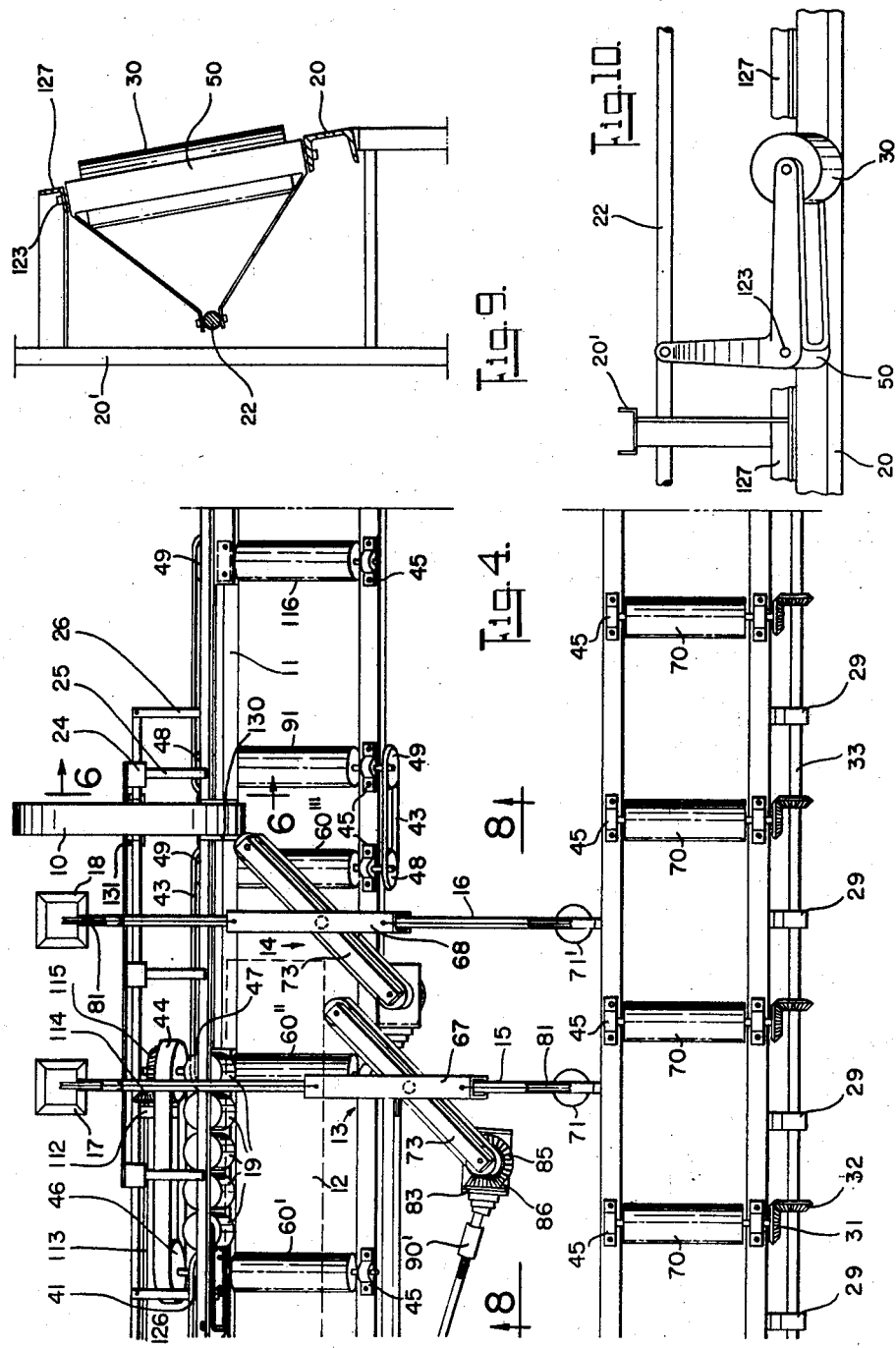

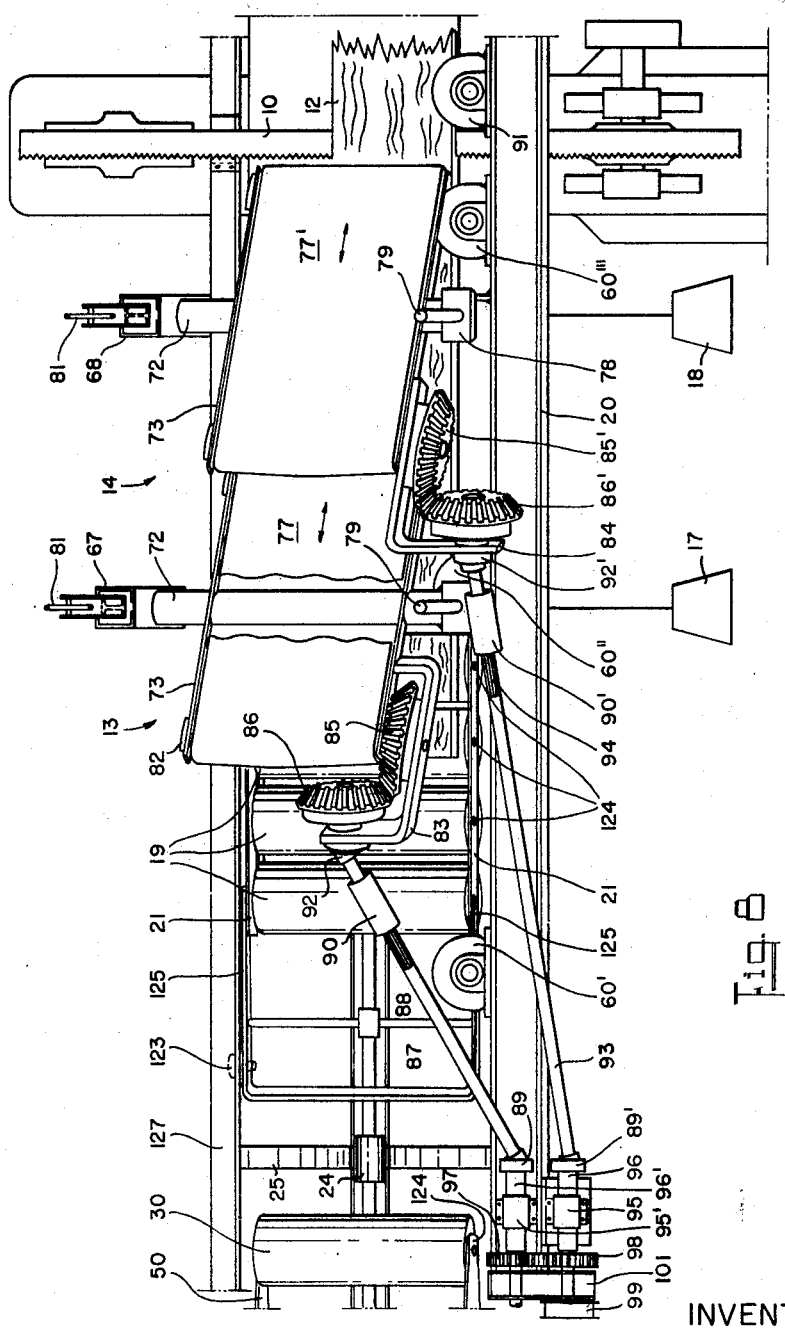

Aug. 16, 1960     C. E. CARD     2,949,138
TIMBER HANDLING APPARATUS FOR RESAWING MILLS
Filed Sept. 25, 1958     6 Sheets-Sheet 5

INVENTOR
CALEB EDGERTON CARD
by R.J. Filipkowski
AGENT

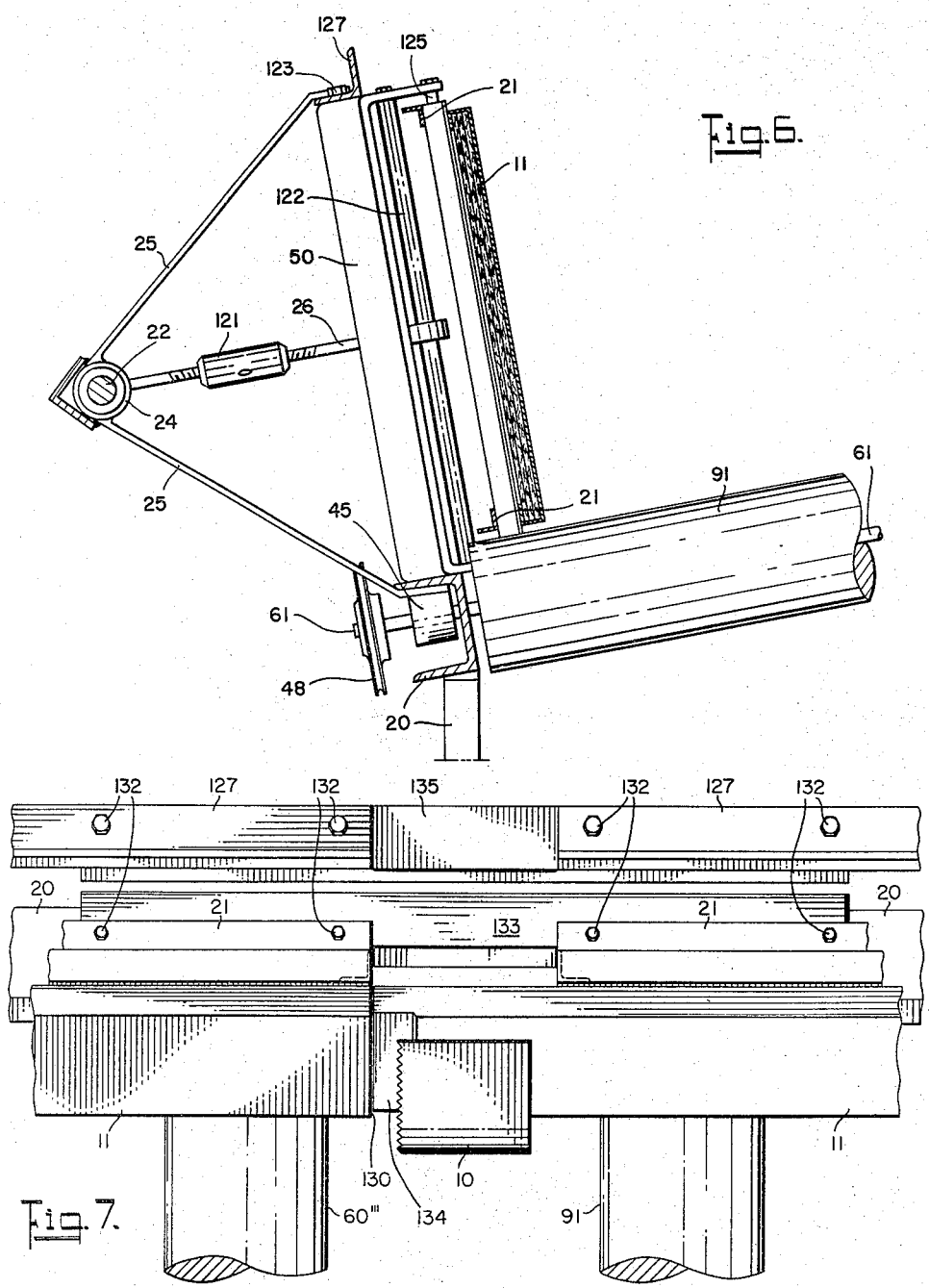

United States Patent Office 2,949,138
Patented Aug. 16, 1960

2,949,138

TIMBER HANDLING APPARATUS FOR RESAWING MILLS

Caleb Edgerton Card, Snow Road, Ontario, Canada

Filed Sept. 25, 1958, Ser. No. 763,365

14 Claims. (Cl. 143—4)

The invention relates to saw mills and in particular relates to apparatus for use in resawing operations for positioning, guiding, and feeding square sided cants or timbers to a saw.

More specifically my invention is concerned to provide an arrangement of saw mill machinery for continuously feeding and aligning a succession of cants or timbers of mixed sizes by a conveyor system comprising sets of inclined horizontal and vertical rolls, including angled driven transport rolls, and lateral pressure rolls for driving and guiding the cant or timber into the saw and returning it to a starting point.

In conventional resawing operations, it is customary to employ a set of horizontal rolls for conveying a cant or timber, deposited at one end of the conveyor as by transfer belts or the like, co-operating with elongate parallel guide walls for aligning the cant prior to feeding into a saw. Heretofore such line-up tables and guides have been unable to handle timbers of different widths without considerable manual attention to spacing of guides and carefully timed feeding of consecutive timbers. I have avoided the use of rigid chutes or complex adjustable guides by aligning cants upon a conveyor system having sets of angled and inclined bottom rolls and inclined vertical rolls, the latter being readily adjustable as a group with respect to a longitudinal plane in which the saw lies to control the thickness of a board sawed from the cant.

It is a primary object of my invention to provide an arrangement for automatically aligning each cant of a succession of cants regardless of their thicknesses, while the cants are moving in closely following relation on powered feed rolls towards the saw.

It is another object of my invention to provide an arrangement of angled and inclined horizontal rolls, and inclined vertical rolls, co-operating to align a cant with the vertical rolls and a tangent co-adjustable fence associated therewith while approaching and being sawn by a band saw.

Yet another object is to provide a pair of powered pressure roll belts angled with respect to the line of advance of a cant for biasing a cant against an adjustable saw fence whereby succeeding cants of greatly differing thickness may be accommodated and each firmly guided without disturbing a previous cant passing through the saw.

Still other objects of the invention will be apparent from a reading of the following description illustrated in the accompanying drawings, wherein, Figure 1 is a partial plan view complemented by Figure 4, of a saw mill showing the loading end of a return feeding saw mill including inclined and angled feed rolls according to the invention;

Figure 4 is a partial plan view of the right hand portion of the saw mill of Figure 1 showing the saw, and pressure roll belts;

Figure 6 is a vertical section taken on the line 6—6 of Figure 4 showing the fence and adjusting means;

Figure 7 is a plan view in enlarged scale of part of the fence and support framing of the saw mill, showing joining members for dis-assembly to permit saw removal;

Figure 8 is an elevation view on the line 8—8 of Figure 4 showing the roll belts and the conveyor system;

Figure 9 (Sheet 4) is a vertical section similar to Figure 2, showing an alternative vertical roll adjustment means; and, Figure 10 is a plan view of part of the sawmill similar to Figure 1 showing the vertical roll adjustment device of Figure 9.

Figure 1:
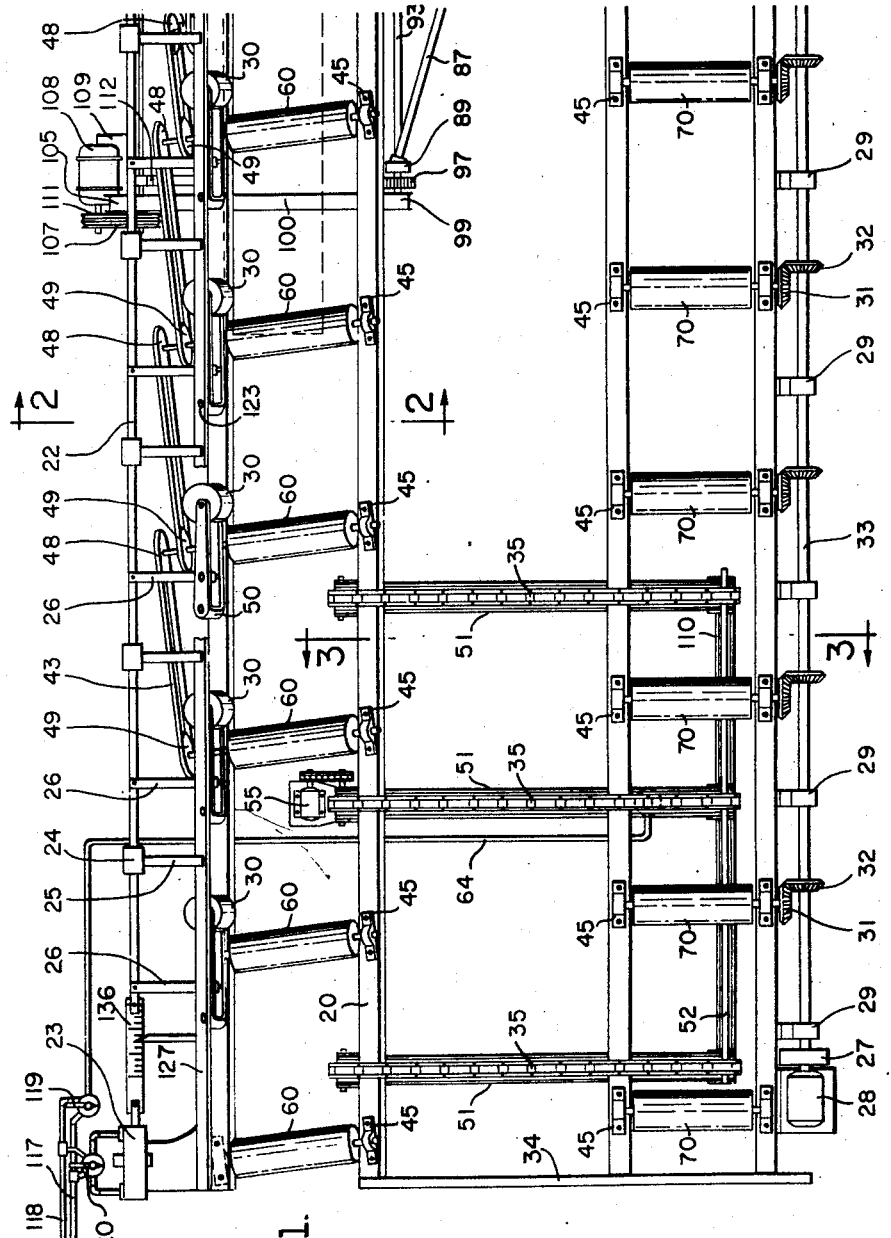

Referring to the drawing, Figures 1 and 4, wherein certain elements of the saw mill are shown in skeleton or diagrammatic form in illustration of an embodiment of the invention, a saw blade 10, preferably a band saw, is disposed parallel with an inclined fence 11, against which a cant such as 12 is pressed and guided by one or both of the pair of roll belt assemblies 13, 14. The latter are movable and supported on overhead transverse frames 15, 16, and are guided thereby to move across the line of advance of a cant with a vertical component of motion, being biased towards the fence by the weights 17 and 18 depending from cables 40 fixed to one end of each assembly. The fence 11 is inclined at an angle to the vertical corresponding to the angle of inclination of the roll belts 13 and 14, and supports at its head end a set of vertical idler rolls 19, whose cylindric surfaces lie in a common plane tangent with the guiding face of the fence. These rolls and the fence are movable as a unit with respect to the saw blade and are aligned in the direction of movement of a cant. The thickness of a board which is to be sawed from the cant by the band saw is determined by the distance between the guiding face of the fence and the blade 10, the latter remaining stationary with respect to a main frame 20.

Figure 2:
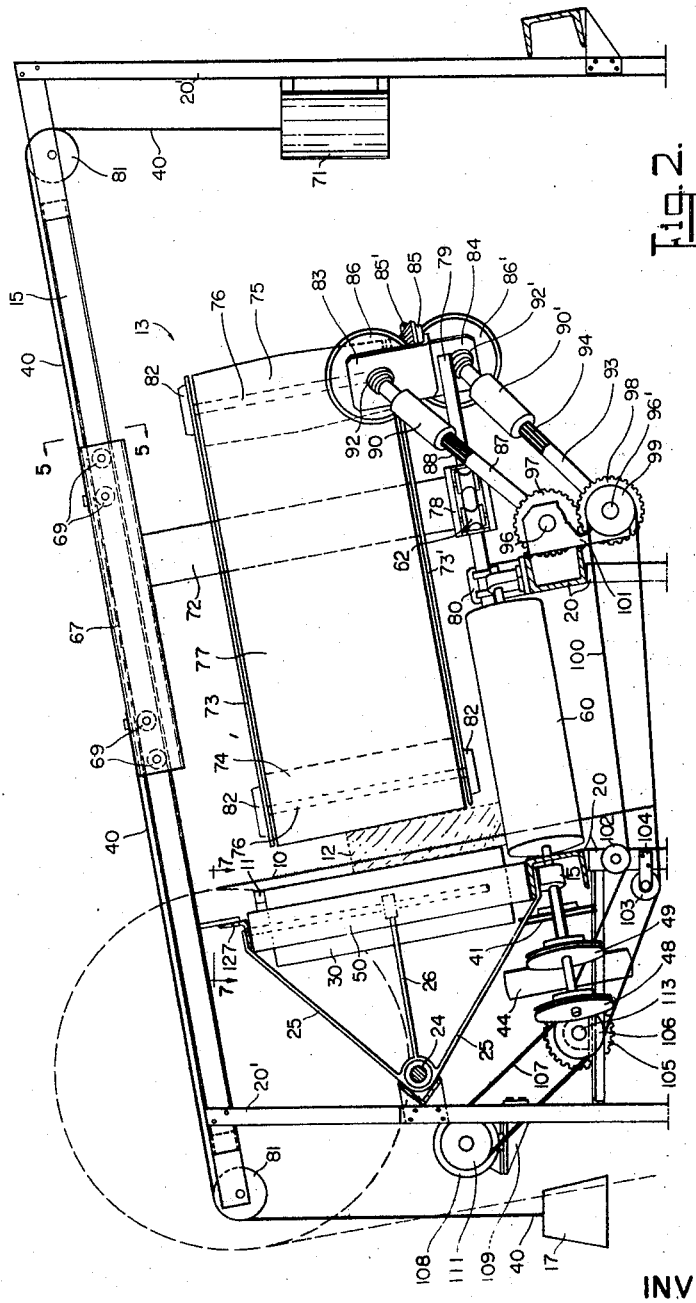
Figure 2 is a section taken on the line 2—2 of Figure 1, showing the horizontal support and adjustable vertical guiding rolls for a cant passing through the saw, and pressure roll belts co-operating with a workpiece in the saw.

The rolls 19 have their ends journalled in angle section extensions 21 fixed to the fence framing, the assembly being movable toward and away from the band saw blade, by means of a system of adjustable swinging support frames 50 hinged in the saw mill frame 20 and controlled in position in dependence upon the longitudinal position of a common setting rod 22. While a number of alternative setting provisions may be employed, I prefer to carry out adjustment of the group of vertical guide rolls by adjusting the position of the piston of a piston and cylinder reversible hydraulic motor 23. The position of rod 22 is indicated by setworks 136 associated with the piston, energized by fluid carried in pressure and return lines 117 and 118. The sawyer may operate the control valve 120 to position the piston as rapidly as desired. Rod 22 is thereby longitudinally moved, sliding through a series of support sleeves 24, which are secured on and braced with respect to the main frame 20 by struts 25. Each of the swinging frames 50 is actuated from the rod 22 by means of connecting link 26, as best seen in Figure 2, which couples to the frame by engaging transverse bar 122, whereby the longitudinal adjustment of rod 22 determines the angular position of each of the swinging frames. The frames pivot on pins 123 rotatable in the main frame 20, and preferably have an arcuate movement limit of several inches. A series of vertically inclined idler rolls 30 are separately journalled in bearings between the outer ends of U-shaped swinging frames, and are supported thereby and are located to above and intermediate the horizontally spaced inclined and angled horizontal rolls 60 journalling in suitable shaft bearings 45 in the frame 20.

The angle of inclination of idler rolls 30 is preferably of the order of 10 degrees from the vertical, which has been found to be a sufficient amount so that a thin board will remain upright and leaning against the vertical rolls as it rides upon the powered horizontal rolls 60. The latter are also inclined a similar amount with respect to the horizontal so that they may contact across the full width of the lower face of a squared timber supported thereupon while the timber has one face tangent to the vertical rolls. The horizontal spacing of the vertical rolls as well as the spacing of the horizontal rolls may conveniently be chosen to be any suitable distance and is preferably so chosen that the span of three of the rolls is not greater than the length of the shortest stick to be passed through the mill.

Adjacent rolls of the set of vertical fence rolls 19 are relatively closely spaced, these preferably being journalled to revolve about their axes with only sufficient clearance to permit free rotation. Such close spacing is desirable to assure effective support of a workpiece going through the saw.

The first six horizontal inclined rolls of the line-up conveyor group have their axes disposed at an angle of about 83 degrees to a longitudinal center line that may be passed to bisect each of feed rolls journaled in the frame 20. By the arrangement described the cants or timbers deposited on the first powered rolls of the group are positively urged to move down the inclined roll faces as they are carried forwardly and inwardly to bear against the vertical idler rolls, thereby automatically aligning the cant with the fence. The last three horizontal rolls 60', 60", 60''' (Figure 4) preceding the band saw have their axes at right angles to the fence and are inclined to maintain the right angle relation with respect to the vertical rolls 19 and the fence 11. The horizontal roll 60''' which is nearest the saw is placed as close as possible thereto, so that the cant or timber will be substantially supported against the downward force applied by the saw teeth in the kerf. Another backup roll 91 occupies a similar position on the opposite side of the saw for the same purpose. Rolls 116, to the right of the saw in Figure 4, are driven independently from the rolls 60 on the feed side of the saw, and have a speed which is generally arranged to be higher than the speed of the front rolls, for the purpose of removing the timber at a speed that will permit it to be carried clear of any following timber and to be transferred to the return line by transfer chains (not shown) corresponding to transfer chains 35 shown in Figure 1.

The conveyor feed rolls 60 are individually driven by their driven pulleys 49 which are fast to the roll axles 61 and ganged with driving pulleys 48. Power is applied directly to the axle of the intermediate straight roll 60" of the group of three transverse rolls 60', 60", and 60''', by a line shaft 113 journalling in bearings 112, powered from main drive motor 108 (Figures 1 and 2) of any suitable type. Bevel pinion 114 (Figure 4) fast on the end of line shaft 113 is coupled in driving relation with the driven bevel gear 115, fast to the axle of roll 60". Belt pulley 44 fixed to the outer end of the shaft of roll 60" is coupled by flat belt 42 with a similar belt pulley 46 mounted on the shaft of the adjacent roll 60' ahead. The V-pulley 41 ganged on the axle of roll 60' is similarly coupled as by an intermediate transmission, Figure 1, with driven pulley 49 fast on the shaft of next adjacent angled roll 60, ahead of it. The transmission may comprise any suitable device for transferring torque between two angularly related shafts, and may comprise a flexible torsion spring or equivalent coupling by means of which the direction of belt drive to the angled feed rolls is shifted about 7 degrees from the longitudinal axis of the machine frame. Each of the four angled and inclined powered horizontal rolls in the feeding end of the conveyor has its driven pulley 49 coupled with the driving pulley 48 of the roll preceding it by means of belts 43, so that they all rotate in the same direction at substantially uniform peripheral velocity to move a cant toward a saw.

A V-pulley 47 ganged on the axle of roll 60" is also belt-coupled by V-belt 43 with pulley 49 on the axle of the next following driven roll 60'''. Backup roll 91 is arranged to be driven by belt drive from shaft-mounted driving pulley 48, through belt 43 passing over its pulley 49. The relative diameters of these two pulleys, may be arranged to provide that the peripheral speed of roll 91 is the same as that of fast roll 116, the same as that of roll 60", or some intermediate speed, depending on the class of material being sawn. In general, the two backup rolls 60''' and 91 will be moving at the same rotational speed, and the proportioning of pulleys 48' and 49', respectively on rolls 91 and 116, will give the latter a speed one third greater than the former.

Provision is made for an idler tensioning pulley or the like (not shown) along the lay of V-belt 43 coupling pulley 41 with the group of angled feed rolls 60 so that drive to them can be stopped while the cant moving upon rolls 60', 60" and 60''' immediately preceding the saw continues. Any suitable clutch means of conventional nature may be employed as control, there being associated therewith a manual control device such as a lever, located at the sawyer's position, whereby to prevent feeding of stock toward the saw without stopping a piece going through the saw.

The return rolls 70 employed in returning a cant or timber which has been carried away on rolls 116 and transferred to the return line by any suitable means, are arranged to be driven at substantially the same speed as rolls 116. With appropriate lateral separation of the resaw conveyor line and the return line, stock ranging from about 6 to 16 feet in length has been found to handle successfully with a speed ratio of rolls 60" and 116 of 3:4. Angled feed rolls 60, also running at the same speed ratio with respect to rolls 60', 60" and 60''', serve to close up the gaps between successive cants or timbers so that there may be substantially no gap at the saw if so desired, with maximum efficiency.

The provision of control means to stop rolls 60 enables a sawyer to examine the cant, turn it as desired, and start it moving to the saw, so that it will traverse the space left between it and the cant ahead and be carried into the saw in abutting relation with the latter. It should be pointed out that any mechanical turning device as known in the art may be employed at the feeding end of roll group 60, such handling device forming no part of the present invention.

Referring particularly to Figures 1, 2, 4, and 8 of the drawing, a cant or timber which has been aligned and is moving on horizontal rolls 60 will eventually come in contact with the face of belt 77 of roll-belt assembly 13, which is moving with a component of surface velocity measured along the direction of cant movement equal to the peripheral speed of the feed rolls. Because of the angular relation of the belts with respect to the line of travel, the moving belt 77 frictionally engages a corner of the timber tending to press the end of the timber against fence 11. Belt 77 may preferably comprise a rubber faced canvas belt or mill belt, under moderate tension. It is supported upon the pair of inclined vertical rolls comprising idler roll 74 nearest the frame 11 and the drive roll 75, the latter being crowned to assist in keeping the belt centered on its length. The idler roll 74 has its axle 76 journalled in end bearings including the upper bearing 82 in frame 73, and a lower bearing 82, secured to the lower frame member 73'. Drive roll 75 has its axle 76 similarly journalled in upper bearing 82 and in a lower bearing (not shown) in frame member 73'. The lower end of axle 76 is made fast to a bevel gear 85, which is driven by a mating bevelled gear 86, the latter journalling in a bearing supported in an upwardly extending arm of bracket 83. Drive to the bevel gear 86 is imparted through a universal joint 92 by the powered shaft 90 integral with an internally splined collar-engaging spline end 88 of main shaft 87.

As the belt roll 13 is caused to be displaced at right angles to the plane of the fence due to passage of a timber or cant between the roll 74 and the fence, shaft 87 deflects and extends as required, as provided for by the pair of universal joints 89 and 92 of constant angular velocity type which accommodate the angular displacement of the shaft with respect to the frame 20.

A second belt-roll assembly 14, located between the assembly 13 and the saw, is in all respects similar to its counterpart described.

Figure 5:
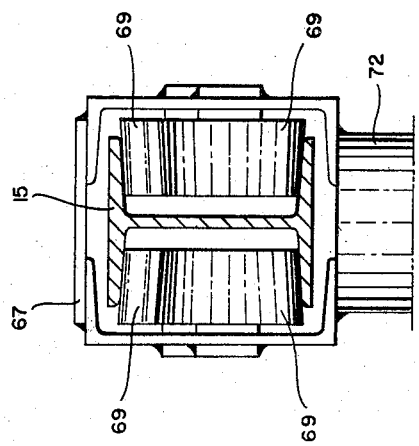
Figure 5 (Sheet 3) is a cross-section taken on line 5—5 of Figure 2 showing part of the roll belt assembly guiding means.

Each of the belt rolls are restrained from twisting and deflecting in any direction except for the transverse displacement referred to, by suspension from a respective trolley carriage 67 and 68, riding on frames 15. As will be observed by reference to Fig. 5, the carriages are guided by sets of rollers 69, journalling in them, the rollers being shaped to engage the flanges of a steel I section overhead gantry or frame 15. The struts 72, which may conveniently be formed as thick pipes permanently secured as by welding to the lower part of each trolley carriage 67 or 68, depend therefrom at right angles to the length of frames 15, and have secured upon their lower ends the box-like roller housings 78. Each of the latter carries sets of shaped rollers 62 journalling therein arranged to roll against opposite sides of a guide bar 79, secured to the saw mill frame 20 by bracket 80. The axis of bar 79 is arranged to lie parallel with the longitudinal axis of the trolley frame 15, whereby the belt roll assembly is prevented from deflecting or twisting while being free to deflect perpendicularly of the fence 11.

Weights 17 and 18, attached to the lower ends of trolley carriages 67 and 68 by cables 40 passing over guide pulleys 81, serve to bias their respective roll belts towards the fence, to apply a pressure against a cant or timber as it passes through the saw. The horizontal force component due to the weight of the structure movable upon the inclined frame 15 together with the additional weight 17, is arranged to provide a force sufficient to substantially offset any tendency for movement of a timber away from the fence due to the action of the saw, impact by a following timber, or other disturbing influence. The total force so applied to a work may conveniently be of the order of 200 pounds for each assembly, although for light stock a lesser amount may be preferred. When warped logs and cants are being sawn, it may be desirable to arrange that only the roll belt nearest the saw exerts appreciable pressure against the workpiece.

As a square-ended cant or timber passes through the saw it eventually reaches the position at which the roll 74 suddenly ceases to be in contact with the side face of the workpiece, whereupon the combined weight of the roll belt 13 and the weight 17, for instance, tends to drive the assembly 13 forcibly towards the fence. Stop devices of suitable nature (not shown) secured in frame 15 and bar 79 establish limit positions for carriage 67 and housing 78, to arrest movement short of frictional rubbing of the belt against the fence. Similar limit means are provided for assembly 14. To reduce impact forces a dashpot device 71 mounted on a vertical frame member 20' is provided for each belt-roll, the dashpot being connected with the higher end of the trolley carriage by cable 40' passing over pulley 81' and arranged to resist sudden movement of the roll toward the fence but offering only minor resistance to oppose displacement in the reverse direction. It is believed that dashpot structures suitable for this purpose, whether constituted as hydraulic, pneumatic, or eddy-current brake devices, are very well known and need not be described in greater detail herein.

The peripheral speed of the belts 77 or 77' passing over idler rolls 74 in each assembly, is arranged to be substantially equal to the surface longitudinal velocity of a cant moving to the saw over the feed rolls. Drive shaft 87 which powers assembly 13, and drive shaft 93 which powers a similar roll-belt assembly 14, are arranged to be driven in tandem at uniform rotational speed from a common power source such as adjustable speed motor 108 which drives the horizontal rolls 60' through gearing as described. This drive system, as may best be observed in Figs. 2 and 8, comprises a pair of spur gears 97 and 98 secured upon horizontal shafts 96 and 96', vertically aligned and running meshed together, whereby the rotations of the two shafts 96 and 96' are equal in angular velocity and of opposite sense. In roll-belt assembly 14, bracket 84 which is secured to the lower frame and is disposed below the driving roll 75' depends downwardly, so that bevel gears 86' and 85' mesh to produce a rotation of the latter effective to impart a movement of belt 77' in the same direction as that of belt 77 in assembly 13. The driving shaft 93 for the second roll-belt assembly is somewhat longer than and disposed below similar shaft 87, and has a similarly splined end 94, slidably engaging the internally splined collar 90'. It will be seen that as pulley 99 on lower shaft 96' is turned by belt 100, gear 98 and shaft 96' journalled in lower bearing 95', are driven, as is universal joint 92', to cause rotation of shaft 93, collar 90', and bevel gears 86' and 85', thereby moving belt 77'. Concurrently, gear 97 on shaft 96 journalling in upper bearing 95 drives the universal joint 92, causing connected shaft 87 and meshed collar 90 to rotate, transferring torque via universal joint coupling 89 to drive the bevel gears 86 and 85 and moving belt 77 in the same direction and at the same velocity as belt 77'.

When the leading end of a relatively wide squared-end cant or timber 12 has advanced as shown in dotted outline in Figure 1 so that it lies between the rolls 60'' and 60''', it is carried into contact against the tensioned belt 77' of roll-belt 14. Depending on the transverse dimension of the cant, the contact zone will generally be a few inches from the curved part of the belt passing over roll 74', along the planar portion or lay. When a workpiece is not interposed, the latter roll lies in its innermost limit position, in which the belt moves with only a small clearance with respect to fence 11. By reason of the drive which is imparted to belt 77' and to cant, assembly 14 is caused to be displaced away from the fence in the manner described for assembly 13, until roller 74' is disposed against the side of the cant, pressing the latter against the fence.

While in practice the yielding of roll belts 77 and 77' due to their inherent resilience does not appreciably detract from the operation of the roll-belt assemblies, it has been found preferable to provide a rigid wall within belts 77 and 77', secured to the frames. By this alternative construction, the roll belts 77 and 77' are prevented from deflecting, with the result that the assemblies 13 and 14 each promptly move outwardly from the fence when a log or cant is pressed against their faces.

The position of assembly 14 longitudinally of the sawmill is so arranged that the contact line along which pressure is applied to the cant lies only a few inches in advance of the cutting edge of the saw 10. The distance between the tips of the saw teeth and any part of belt 77' should preferably be made as small as possible while yet providing a running clearance at any setting of fence 11. The distance may be made as small as the sum of the roll radius plus allowance for belt thickness. However, if the sawmill is to be operated to cut only relatively thin boards, the distance may be somewhat less than the radius of roll 74'.

It will now be evident that the guiding and feeding arrangements described permit handling a succession of mixed sizes of cants and timbers. As an example, which is intended merely to be illustrative and in no way limiting, such a sawmill has been employed to cut two-inch boards from squared logs of sizes ranging from 11 to 28 inches diameter, during which operation cants less than six inches wide, were successfully conveyed on edge and sawed, while preceding and following timber of the largest size were handled without disturbing or impeding the sawing of thin stock. Continuous sawing of cants is possible since the end of the following cant will readily be conveyed by the relatively higher speed front feed rolls 60 to close the gap due to delayed loading of cants on the front rolls. It has been found in practice that the vertical rolls 30 and the fence 11 may readily be adjusted when the saw is not being engaged by a workpiece, so that in addition to mixed sizes, mixed grades and thickness may be sawn from a sequence of cants.

By the practice of the invention extremely thin strips or boards of considerable width may be accurately and uniformly sawn from cants or thicker boards. To facilitate making such extremely thin cuts, the fence is vertically grooved as at 134, in Fig. 7, extending the whole height of the fence. The length and depth of the groove are both made sufficient to accommodate the set of the saw teeth without rubbing against the fence, for saw positions giving minimum cuts. The groove may be, for example, five thirty-seconds deep and one and a quarter inches long, measured in the direction of cant movement.

Figure 3:
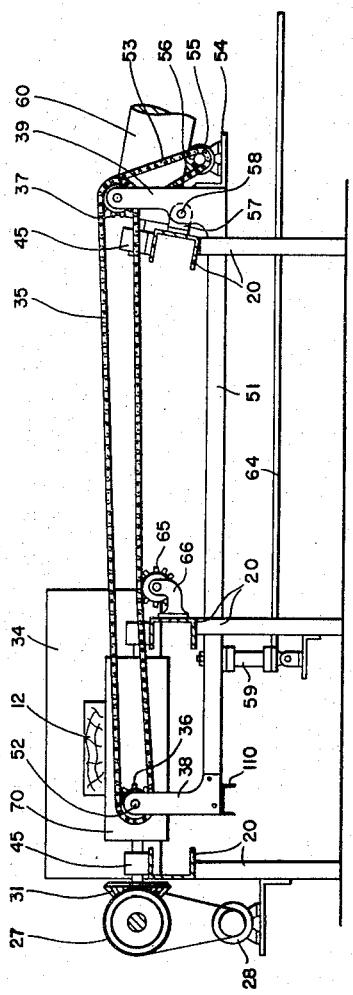
Figure 3 is a sectional view taken on the line 3—3 of Figure 1, showing return conveyor rolls, and a log storage transfer chain for delivering cants to the angled feed rolls.

In addition to the control for stopping the front rolls 60 while all other conveyor rolls remain running, the timber transfer chains 35 extending from return rolls 70 to rolls 60 constitute a regulatory mechanism permitting an important further control over sawmill operation. The mechanism, shown in Figs. 1 and 3, comprises a group of parallel transverse frames 51 extending beneath longitudinal framing channels 20 comprising supports for the return rolls and front feed rolls. Each frame 51 has upright extensions 38 and 39 secured on its ends, upright 39 being supported upon a bracket 57 secured to the side of channel 20 under the front feed rolls. A joining member 110 is secured between the ends of frames 51 remote from their pivot axles.

Chains 35 are carried upon respective driven sprockets 36 whose axle 52 journals in uprights 38, and upon drive sprockets 37 whose individual axles are similarly rotatable and journal in the upper ends of uprights 39. Common axle 52 is coupled to each driven sprocket so that the chains all move together under drive imparted to one of them, for example, the center chain of the group of three shown. The platform extension 54 secured to the pivoting end of a frame 51 supports drive motor 55 secured thereon, which is controllably energizeable by suitable means (not shown) preferably at the sawyer's position at the head of the front roll group. Motor 55 imparts drive by sprocket 56 to transmission chain 53, which drives the axle of one of the transfer chain sprockets 37, in a chosen direction, which for purposes of transferring a timber will cause the upper lay of chains 35 to move towards rolls 60.

A timber arriving on return conveyor rolls 70 is stopped by wall 34 extending across the direction of movement, whereupon the chains 35, normally lying below and out of contact with a timber, are caused to be elevated, passing upwardly between rolls 70, to lift the timber clear and moving it while resting upon the upper lays of the chains towards rolls 60. While automatic control means responsive to the impact of a timber against wall 34 may be readily devised to cause initiation of the timber transfer operation, the basic function of the transfer may be simply ordered by entirely manual control means as shown, comprising hydraulic or pneumatic valve 119. At least one fluid motor 59 of the linear-acting type may be employed, there being provided suitable fluid pressure and return lines indicated at 64 for selectable communication with main pressure and return lines 117, 118. The motor or motors are each supported upon the mill framework beneath a frame or frames 51, and are linked with the transfer chain framework, whereby to elevate the chains when fluid under pressure is applied in one sense by valve 119, and to lower the chains when pressure is reversely applied. It will be readily apparent that a number of cants or timbers may be supported on the upper lay, chain drive motor 55 being suitably controlled to traverse a cant a limited distance, for example just sufficiently to clear rolls 70 before being stopped and the chains are lowered. In this manner, a number of cants may at one time be removed from circulation and brought into a storage position, from which they may successively be released by briefly energizing motor 55 to cause the stored group to be moved towards rolls 60. The cant nearest the rolls will thereupon be deposited upon the moving feed rolls in its original position, or it may be manually turned over as it is dropped onto the rolls. It is to be observed that the axles of sprockets 37 lie in a line which would pass through the upper ends of inclined rolls 60, whereby the depositing of cants may be assured normally without their rolling over, unless extra force is deliberately applied. The slight rocking movement of frames 51 about pivots 58 is insufficient to appreciably alter the relative position of sprockets 37 with respect to the rolls 60.

An idler sprocket 65 energizes the lower lay of each chain, journalling in a fixed bracket 66 secured to longitudinal frame channel 20, to assure clearance of the chain with respect to the mill frame. It will readily be understood that various other chain support rolls may be employed including frame-supported idler rolls under the upper lays of the chains, provided such rollers are spaced from rolls 70 and do not interfere with the lowering of these portions of the upper lay required to move below the plane tangent to the upper faces of rolls 70.

Suitable gate means are provided in fence 11, in upper longitudinal frame angle 127, in setting rod 22, and in lower channel 20 of the mill frame, to permit band saw 10 to be bodily removed or replaced laterally. Such gate means, as partly shown in Fig. 7, may comprise a splicing angle section 135 joined between spaced portions of angle 127 and detachably secured therewith by bolts 132. Fence extensions 21 are similarly spliced by angle insert 133, as are channel 20 and setting rod 22, by similar joining pieces (not shown). The joining pieces bridge gaps in the longitudinal members through which, when the pieces are removed, the band saw is removed.

The fence is preferably separated at joint 130 which is arranged to lie adjacent and ahead of the saw teeth, at one end of vertical groove 134.

Various forms of indicator may be employed for the indication of longitudinal position of setting bar 22, which determines the relative lateral positions of vertical guide rolls 30 and fence 11, relatively to rolls 60. One form which may conveniently be used is a direct-indicating fixed pointer and moving scale device, 136, the scale being affixed directly to bar 22 or a coupling link between it and motor 23. The calibration of the scale may be in sixty-fourth inch divisions, and may be designed for moving reference point, as will be required when employed with the alternative setting mechanism of Fig. 6. In this mechanism, link 26 is in two parts having reversely threaded ends engaging turnbuckle 121, so that the length between pin 122 and bar 22 may be varied depending on thickness of cut. As shown in Fig. 1, inch cut may be provided when the links 26 are at right angles to bar 22, whereby rolls 30 lie at their innermost position, so that movement of bar 22 decreases the cut. By adjusting turnbuckles 121, each roll 30 and fence 11 may be brought to a predetermined position to determine a maximum cut when the saw is located in a reference position. Accordingly, all scales 136 may be uniform and a single scale movable by unit increments may suffice.

I claim:

1. In a resawing machine having a saw and a main support structure therefor, the combination of a longitudinal frame, means journalling a first series of parallel guide rolls in said frame having their axes inclined from the vertical and having a common tangent first plane, a saw fence supported in said longitudinal frame aligned with said first plane, a series of driven conveyor front rolls and carry-away rolls journalled in said main support structure for moving a cant respectively to and away from said saw having a common tangent second plane inclined from the horizontal to intersect said first plane at right angles along a valley of a right-angled guide trough, means mounting said longitudinal frame for adjustable transverse movement in said main support structure normal to said fence whereby to vary the relation of a cant with respect to the kerf plane of said saw, said driven rolls having their axes disposed at an acute angle with respect to a third plane which is normal to the first and second planes and being angled forwardly outwardly from said valley, a sub-frame movable across said trough above said driven rolls, means for pressing a cant against the said guide rolls comprising an inner and an outer powered drive roll having their axes parallel with the rolls of said first series and being journalled in said sub-frame, and a tensioned belt carried on said rolls, said inner roll being disposed longitudinally nearest said saw.

2. A resawing machine as in claim 1 having at least two saw feed rolls disposed between the front and the carry-away rolls adjacent the saw, said saw feed rolls running with a longitudinal surface velocity less than the longitudinal velocity of said front and said carry-away rolls.

3. In a sawmill having a stationary saw, a longitudinal frame, a cant-supporting and conveying organization comprising a first series of rolls tilted from the vertical laterally of said frame and a second series of powered rolls including front feed, saw rolls, and carry-away rolls tilted from the horizontal to form with said first series of rolls an inclined vertical wall and an intersecting horizontal wall of a right-angled cant-feeding trough, at least one pair of spaced pressure rolls supporting a tensioned belt above said second series of rolls in the path of advance of a cant therealong, means supporting said pressure rolls and belt for movement transversely of said path to press a cant against rolls of said first series, means driving said pressure rolls and belt at a speed to advance a cant into the saw at a speed fractionally less than the speed of said front feed rolls and equal to the speed of said saw rolls, and means for bodily moving said first series of rolls in a direction normal to the inclined vertical wall of said guide trough with respect to said saw, whereby to vary the relationship of the kerf plane of said saw thereto for determining the thickness of sawn lumber.

4. A sawmill as in claim 3 wherein said pressure rolls are spaced transversely and longitudinally of said frame, the inner roll being adjacent the saw and the outer roll being longitudinally spaced ahead of the saw therefrom.

5. A sawmill as in claim 3 wherein said means for bodily moving said first series of rolls includes a movable setting frame journalling said first series of rolls and supporting a saw fence aligned with the vertical wall of said trough and extending ahead of and behind the saw.

6. A sawmill as in claim 3 wherein at least one powered roll adjacent each side of the saw has its axis disposed transversely to the path of movement of a cant, and has a longitudinal surface velocity fractionally less than the velocity of the front rolls and of the carry-away rolls.

7. In a resawing machine having a stationary saw, a main support structure, a longitudinal frame, spaced horizontal series of transverse powered conveyor and feed rolls journalled in the frame for feeding and returning cants and transfer means for transferring cants between rolls of said series, the improvement which comprises a cant-aligning conveyor ahead of the saw having a plurality of powered front feed rolls having their axes tilted from the horizontal and disposed at an acute angle with respect to the line of advance of a cant, a plurality of idler rolls having their axes inclined to the vertical to form with said powered rolls a right-angled cant-guiding trough for aligning a face of a cant to ride against said idlers, a saw fence aligned with the vertical idler rolls, a setting frame, means mounting said idler rolls and said fence for joint movement with said setting frame transversely of the path of a cant with respect to the kerf plane of said saw whereby to determine the thickness of sawn boards, at least one pair of spaced pressure rolls disposed above said powered rolls and guidedly movable with respect to said longitudinal frame in a direction normal to the fence powered for rotation about axes parallel with said idler rolls, and having a tensioned belt supported between them, and bias means yieldably urging said at least one pair of pressure rolls and belt for pressing a cant against said fence for advancing said cant into the saw.

8. A resawing machine as in claim 7 wherein said idler rolls are journalled in individual swinging frames linked by said setting frame and pivotable about axes inclined to the vertical in said longitudinal frame, said swinging frames being linked with a common setting bar reciprocable in said main support structure.

9. A resawing machine as in claim 7, wherein said bias means for urging said pressure rolls toward said fence include a stationary guide track inclined transversely downwardly toward said fence, a carriage including track-engaging wheels journalled therein movable along said track, said pressure rolls journalling in a downwardly extending braced framework affixed to said carriage.

10. A resawing machine as in claim 7 including at least one powered saw feed roll disposed between the saw and said front feed rolls and a powered feed roll following the saw, and a plurality of powered carry-away rolls, said front feed rolls and said carry-away rolls having a longitudinal surface velocity greater than the longitudinal surface velocity of said saw feed rolls.

11. A resawing machine as in claim 7 wherein a first pair of pressure rolls and associated tensioned belt are spaced longitudinally from a second pair of like pressure rolls and associated tensioned belt, said first and said second pair of pressure rolls journalling in respective sub-frames depending from like carriages moveable along an overhead track above said feed rolls for applying pressure to a cant adjacent the saw, the inner roll of each pair being longitudinally nearer the saw than the outer roll, and weight means linked with said carriages for urging said carriages and rolls toward limit positions at which the inner rolls have a running clearance with respect to the fence.

12. In a resawing machine, a cant supporting and conveying organization comprising a first series of upright rolls and a second series of powered horizontal feeding rolls for moving a cant therealong, a saw fixed in the machine having its kerf plane lying in the path of cant movement, a saw fence aligned with said upright rolls extending ahead of and beyond said saw, a pair of powered pressure rolls having axes parallel with said upright rolls spaced apart transversely of and along said path carrying a moving belt therebetween, biasing means for yieldably pressing said rolls and belt toward said fence for holding a cant against said fence by pressure of the roll nearer the fence and for advancing the cant into the saw, and means for bodily moving said upright rolls and said fence in a direction normal to said cant advance whereby to determine thickness of sawed lumber.

13. In a resawing machine the combination with a saw of cant-feeding powered horizontal rolls and upright idler rolls, wherein the common tangent planes of said roll surfaces are respectively inclined to the horizontal and to the vertical and intersect at right angles to form a trough having a valley for guiding a cant lying against said roll surfaces into said saw, said horizontal rolls having axes angled so that their ends remote from said valley lie in the direction of feeding with respect to their valley ends, movable roll supports independently journalling said idler rolls for swinging movement about axes parallel with and spaced from said idler roll axes, a saw fence disposed ahead of and extending beyond said saw, means jointly linking said roll supports for aligning said rolls with said fence, and setting means for moving said rolls and said fence transversely of said trough to vary the relationship of said saw with respect to said cant for determining thickness of sawed lumber.

14. A resawing machine as in claim 13 further including means for positively urging the cant against said fence comprising at least one pair of powered pressure rolls disposed above said horizontal rolls and journalled in a carrier movable at right angles to said idler roll axes, said pair of rolls having their axes spaced apart and parallel with said idler rolls, one pressure roll being disposed nearer the fence and lying further along in the feeding direction than the other roll of the pair, an endless tensioned belt carried by said pair of rolls, said carrier being yieldably biased to hold a cant against said fence and having a stop limit position to provide a predetermined clearance between said nearer roll and the fence in the absence of a cant.

References Cited in the file of this patent
UNITED STATES PATENTS

| | | |
|---|---|---|
| 113,926 | Pryibil | Apr. 18, 1871 |
| 166,355 | First | Aug. 3, 1875 |
| 230,110 | Cunningham | July 20, 1880 |
| 721,789 | Duncan | Mar. 3, 1903 |
| 1,252,894 | Fitzgerald | Jan. 8, 1918 |
| 1,816,270 | Walters | July 28, 1931 |
| 1,959,475 | Hutchings | May 22, 1934 |
| 2,242,932 | Turner et al. | May 20, 1941 |
| 2,621,693 | Grills | Dec. 16, 1952 |